Patented Oct. 6, 1936

2,056,438

UNITED STATES PATENT OFFICE 2,056,438

EXTRACTION OF TOXINS FROM ROOTS FOR THE MANUFACTURE OF INSECTICIDES

Harold Greig Ward, Wallasey, England

No Drawing. Application September 4, 1935, Serial No. 39,188. In Great Britain March 30, 1935

3 Claims. (Cl. 167—24)

This invention relates to the extraction of toxins, for the manufacture of insecticides, from Derris, Barbasco and Timbo roots, such, for example as Lonchocharpus nicou, Derris elliptica, Derris chinensis, Derris malaccensis and other roots containing rotenone.

It has been proposed to prepare an ether extract from roots containing rotenone by digesting the ground roots in ether and evaporating this extract which is then dissolved in carbon-tetrachloride ($CCL_4$) wherein, after freezing, rotenone is crystallized. This process, however, gives as its product crystalline rotenone only, such other toxins as may be present, for example, deguelin, tephrosin and toxicarol, and which are also of insecticidal value, being omitted since they are amorphous and do not crystallize. Further, the rotenone-carbon tetrachloride combination is soluble only in a limited group of expensive solvents which, moreover, are injurious to plant life, and the said combination cannot be diluted with any inexpensive common solvent such, for example, as water or alcohol. The object of the present invention is to provide a process which is not only simple and inexpensive but will overcome the above difficulties.

To this end according to the present invention the rotenone-containing roots in crushed or ground form are digested in common alcohol acidulated by chemically pure sulphuric acid and the mixture is then filtered so that the final filtrate contains the rotenone and incidentally also other toxins of insecticidal value present in the root.

After digesting the crushed root in the acidulated alcohol and filtering, the filtrate may be neutralized as by adding sodium carbonate and then refiltering.

The final filtrate may be diluted by the addition of water so that the product is in liquid form ready for application as a wash or by means of a spray. Alternatively, the final filtrate may be mixed with soft soap or other emulsifying or spreading agent so that the final product is in a semi-solid form which can be diluted with water before use.

When Barbasco root is employed, the root in a crushed or ground state is treated with common alcohol ($C_2H_5OH$) in the proportion of 100 grammes of the ground root to 400 ccs. of common alcohol to which is added 1½% by volume of chemically pure sulphuric acid. The addition of the sulphuric acid raises the temperature and the vessel containing the root and acidulated alcohol is insulated with a view to conserving the heat generated. The vessel is now allowed to stand for 7 or 8 hours during which period of digestion the cell structures of the roots are broken down and the alcohol dissolves out the rotenone as also the tephrosin, deguelin and toxicarol. After the period of digestion the temperature is raised to, say, 50° or 60° C. by supplying heat from an external source for, say 15 minutes, and the mixture is then filtered, a small quality of pure alcohol being finally passed through the filter so as to rinse the solid residue.

The filtrate, i. e. the liquor which has passed through the filter, contains not only the rotenone but incidentally also the other toxins, namely, the deguelin, tephrosin and toxicarol. If deemed desirable, the excess sulphuric acid in this filtrate may be neutralized as by the addition of a small quantity of sodium carbonate or other suitable alkali and the liquor then refiltered. Such neutralization is, however, not essential since the liquor can be diluted by the addition of water, all the toxins remaining either in solution or in suspension in the form of very fine precipitate.

The final filtrate itself may either be used in this diluted liquid form, say, for spraying trees, or the filtrate may be mixed with soft soap or other emulsifying or spreading agent and distributed in this semi-solid form which can be mixed with water to form a wash before application.

If it is desired to obtain the rotenone alone, this can be crystallized from the acidulated liquor or filtrate by drying the latter and redissolving the resulting viscous residue in carbon-tetrachloride from which the rotenone can be crystallized. In this crystalline form, however, the rotenone is inconvenient to apply since the crystals are insoluble in water and a solution suitable as a wash or spray can only be prepared by means of one of a small group of expensive solvents which, moreover, cannot be used on trees or plants since they destroy plant life. Further, the crystalline product tends to lose its toxic properties when exposed to actinic light.

With the process according to the present invention, on the other hand, not only does the product include the rotenone together with other toxins present in the root and having valuable insecticidal properties, but the product can be distributed in liquid form ready for application with or without preliminary dilution by water, or in semi-solid form which can be diluted by the addition of water before being applied as a wash or spray. The product, either in its liquid or semi-solid form, is moreover somewhat less susceptible to actinic light than is crystalline rotenone.

It will be understood that though the invention has been described by way of example as applied to Barbasco root, the same process is applicable to other roots containing rotenone, such, for example, as Derris and Timbo roots which also contain deguelin, tephrosin and other toxins associated therewith.

What I claim as my invention and desire to secure by Letters Patent is:—

1. The process for extracting toxins for the manufacture of insecticides from roots containing rotenone, comprising the steps of digesting the roots, in a broken up state, in common alcohol acidulated by chemically pure sulphuric acid, and filtering the mixture, the filtrate containing the rotenone and also other toxins of an insecticidal value present in the root.

2. The process for extracting toxins for the manufacture of insecticides from roots containing rotenone, comprising the steps of digesting the roots, in a broken up state, in common alcohol acidulated by chemically pure sulphuric acid, filtering the mixture, neutralizing the said filtrate and refiltering, the final filtrate containing the rotenone and also other toxins of an insecticidal value present in the root.

3. The process for extracting toxins for the manufacture of insecticides from Barbasco root, comprising the steps of treating the root, in a broken up state, with common alcohol in the proportion of 100 grammes of the root to 400 c. c. s. of common alcohol to which is added 1½% by volume of chemically pure sulphuric acid, allowing the mixture to digest under the action of the internal heat generated, the common alcohol dissolving out the rotenone, tephrosin, deguelin and toxicarol, raising the temperature of the mixture by heat derived from an external source, filtering the mixture, neutralizing the filtrate by adding sodium carbonate thereto, refiltering, this final filtrate containing not only the rotenone but also the deguelin, tephrosin and toxicarol, and mixing the final filtrate with soft soap.

HAROLD GREIG WARD.